(12) United States Patent
Barker et al.

(10) Patent No.: US 9,438,278 B2
(45) Date of Patent: Sep. 6, 2016

(54) MULTI-ARRAY ANTENNA

(71) Applicant: Quintel Technology Limited, Bristol (GB)

(72) Inventors: David Edwin Barker, Stockport (GB); Lance Darren Bamford, Pittsford, NY (US); Peter Chun Teck Song, San Francisco, CA (US); David Sam Piazza, San Jose, CA (US)

(73) Assignee: Quintel Technology Limited, Bristol (GB)

( * ) Notice: Subject to any disclaimer, the term of this patent is extended or adjusted under 35 U.S.C. 154(b) by 114 days.

(21) Appl. No.: 14/186,524

(22) Filed: Feb. 21, 2014

(65) Prior Publication Data

US 2014/0242930 A1    Aug. 28, 2014

Related U.S. Application Data

(60) Provisional application No. 61/767,964, filed on Feb. 22, 2013.

(51) Int. Cl.
| | |
|---|---|
| *H01Q 21/08* | (2006.01) |
| *H04B 1/00* | (2006.01) |
| *H01Q 1/24* | (2006.01) |
| *H01Q 21/26* | (2006.01) |
| *H01Q 5/42* | (2015.01) |

(52) U.S. Cl.
CPC ............ *H04B 1/0053* (2013.01); *H01Q 1/246* (2013.01); *H01Q 5/42* (2015.01); *H01Q 21/08* (2013.01); *H01Q 21/26* (2013.01)

(58) Field of Classification Search
CPC .................. H01Q 5/42; H01Q 1/246; H01Q 21/00–21/30
See application file for complete search history.

(56) References Cited

U.S. PATENT DOCUMENTS

| | | | | |
|---|---|---|---|---|
| 3,409,890 A | * | 11/1968 | Redlich | ..................... G01S 1/02 342/412 |
| 3,964,067 A | * | 6/1976 | Lucas | .................... H01Q 21/06 342/412 |
| 4,689,627 A | * | 8/1987 | Lee | ......................... H01P 5/103 333/117 |
| 5,204,686 A | * | 4/1993 | Petrelis et al. | ................ 342/374 |
| 6,072,432 A | | 6/2000 | Powell et al. | |

(Continued)

FOREIGN PATENT DOCUMENTS

WO    WO03/107474 A2    12/2003

OTHER PUBLICATIONS

PCT International Search Report and Written Opinion for PCT/US2014/017808, dated Jul. 3, 2014, pp. 1-13.

*Primary Examiner* — Gennadiy Tsvey

(57) ABSTRACT

In one example, the present disclosure describes an antenna system with at least two linear antenna arrays, each having a plurality of antenna elements. Each array is designed to transmit and receive signals from different respective spectrum bands. The first antenna array and second antenna array are arranged to form one longer, combined linear array of antenna elements. In addition, at least one antenna element is shared between the first and second antenna arrays. In one example, the first antenna array is connected to a first RF distribution and phase-shifting network to distribute RF power and impart a phase profile across the first antenna array and the second antenna array is connected to a second RF distribution and phase-shifting network to distribute RF power and impart a phase profile across the second antenna array.

21 Claims, 7 Drawing Sheets

(56) References Cited

U.S. PATENT DOCUMENTS

| | | | |
|---|---|---|---|
| 6,091,365 A * | 7/2000 | Derneryd | H01Q 1/246 343/700 MS |
| 6,201,801 B1 | 3/2001 | Dent | |
| 6,211,841 B1 * | 4/2001 | Smith | H01Q 1/246 343/797 |
| 7,050,005 B2 * | 5/2006 | Gottl | H01Q 1/246 343/700 MS |
| 7,068,222 B2 * | 6/2006 | Koparan | H01Q 1/246 343/700 MS |
| 7,663,544 B2 * | 2/2010 | Thomas | H01Q 1/246 342/361 |
| 7,724,176 B1 * | 5/2010 | Pruett | H01Q 3/02 342/175 |
| 7,808,443 B2 * | 10/2010 | Lindmark | H01Q 1/523 343/815 |
| 8,009,111 B2 * | 8/2011 | Baliarda | H01Q 1/36 343/700 MS |
| 8,185,162 B2 * | 5/2012 | Haskell | H01Q 1/246 342/423 |
| 8,269,687 B2 * | 9/2012 | Lindmark | H01Q 1/246 343/810 |
| 8,416,142 B2 * | 4/2013 | Gottl | H01Q 1/246 343/797 |
| 8,798,679 B2 * | 8/2014 | Shimizu | H01Q 1/246 343/758 |
| 2002/0140618 A1 * | 10/2002 | Plet | H01Q 5/42 343/797 |
| 2004/0145526 A1 * | 7/2004 | Puente Baliarda | H01Q 1/246 343/700 MS |
| 2005/0146481 A1 * | 7/2005 | Baliarda | 343/844 |
| 2007/0008236 A1 * | 1/2007 | Tillery | H01Q 21/30 343/797 |
| 2007/0030208 A1 * | 2/2007 | Linehan | 343/757 |
| 2007/0080886 A1 * | 4/2007 | Thomas et al. | 343/824 |
| 2008/0062062 A1 * | 3/2008 | Borau | H01Q 1/246 343/844 |
| 2009/0096700 A1 * | 4/2009 | Chair | H01Q 21/26 343/797 |
| 2009/0224995 A1 * | 9/2009 | Puente et al. | 343/850 |
| 2009/0278759 A1 * | 11/2009 | Moon | H01Q 1/246 343/810 |
| 2010/0194629 A1 * | 8/2010 | Craig | H01Q 1/288 342/354 |
| 2010/0227646 A1 * | 9/2010 | Ogawa | H01Q 1/246 455/562.1 |
| 2012/0062440 A1 * | 3/2012 | Tasaki | H01Q 1/246 343/841 |
| 2012/0280878 A1 * | 11/2012 | Timofeev | H01Q 1/246 343/793 |
| 2012/0280880 A1 * | 11/2012 | Arvidsson | H01Q 1/246 343/810 |
| 2013/0072247 A1 * | 3/2013 | Park et al. | 455/513 |
| 2014/0368395 A1 * | 12/2014 | Dauguet | H01Q 1/246 343/798 |

* cited by examiner

MULTI-ARRAY ANTENNA

CROSS REFERENCE TO RELATED APPLICATIONS

This application claims priority to U.S. Provisional Patent Application Ser. No. 61/767,964, filed Feb. 22, 2013, which is herein incorporated by reference in its entirety.

FIELD OF THE DISCLOSURE

The present disclosure relates generally to antenna systems, and more specifically to base station antenna systems to support multiple spectrum bands.

BACKGROUND

Cellular mobile operators are using more spectrum bands and increasingly more spectrum within each band in order to satisfy growing subscriber traffic demands, and for the deployment of new radio access technologies, in particular Long Term Evolution (LTE) and LTE-Advanced radio access technology. Cellular sites therefore need base station antenna solutions which can support multiple spectrum bands. Most cellular operators who have multiple bands often group these into low-band spectrum bands and high-band spectrum bands. For instance, in Europe, the 800 MHz and 900 MHz bands are typically classed as low-band spectrum bands, whereas 1800 MHz, 2100 MHz and 2600 MHz are typically classed as high-band spectrum bands.

Cellular networks use a variety of base station and antenna solutions depending upon the physical environment, the radio channel environment, radio frequency (RF) power, service coverage and capacity requirements. Base station sites are often classified into for example, macro-cell, micro-cell, small cell, indoor cell, Distributed Antenna System (DAS), etc. Macro-cell sites are designed for wider area coverage and typically have sectorized panel antenna arrays with a directive main beam to obtain necessary gain, and which are located above the average height of the surrounding buildings.

SUMMARY

In one embodiment, the present disclosure describes an antenna system with at least two linear antenna arrays, each having a plurality of antenna elements. Each array is designed to transmit and receive signals from different respective spectrum bands. The first antenna array and second antenna array are arranged to form one longer, combined linear array of antenna elements. In addition, at least one antenna element is shared between the first and second antenna arrays. In one example, the first antenna array is connected to a first RF distribution and phase-shifting network to distribute RF power and impart a phase profile across the first antenna array and the second antenna array is connected to a second RF distribution and phase-shifting network to distribute RF power and impart a phase profile across the second antenna array.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
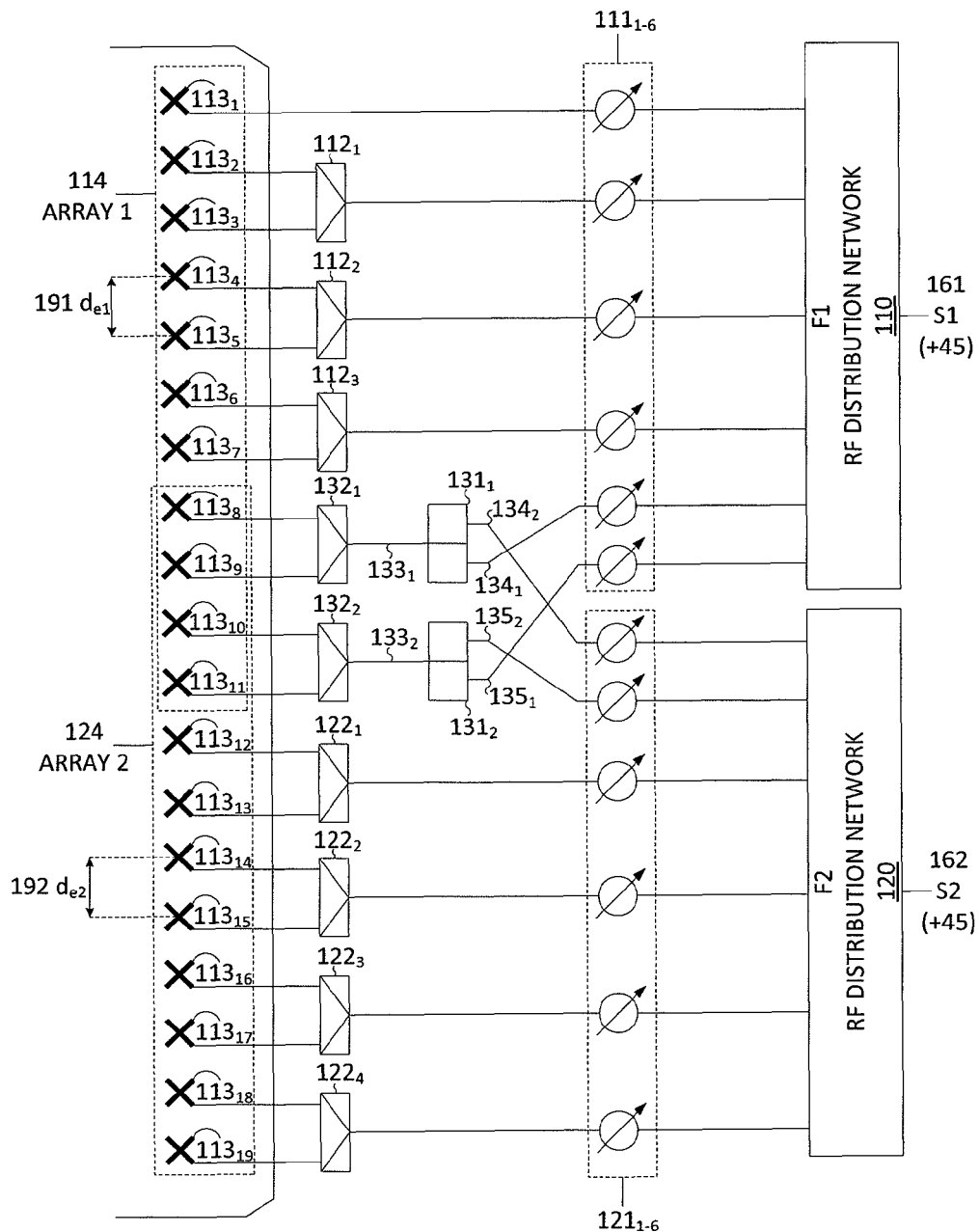
FIG. 1 depicts a dual cross-polarised antenna array topology, e.g., for operation in the 1710-2170 MHz and 2600 MHz spectrum bands, according to the present disclosure.

Embodiments of the present disclosure deliver a multi-band antenna array topology design which covers at least two spectrum band ranges and provides independent beam tilting per spectrum band, while maximising tilt-range, side-lobe level and inter-band passive inter-modulation (PIM) performance, within a defined useable total multi-band antenna aperture size. For example, in one embodiment, at least two antenna arrays, which are designed for transmission and reception of signals in two respective spectrum bands, are arranged such that at least one, but not all antenna elements are shared between the two spectrum bands. This arrangement has several advantages. For example, the two arrays can be positioned adjacent to or co-axial with for example a third antenna array designed for operation in a third spectrum band, but which may dictate a preferred bound or maximum length of the overall multi-array antenna system. The present disclosure therefore allows the first and second antenna arrays to be of desired length and hence gain, and also to exploit optimal antenna spacing or pitch for a proportion of the array length, which affords design freedom for performance parameters such as tilt-range, and sidelobe level suppression. Embodiments of the present disclosure aim to consume what would otherwise be empty spaces within a conventional multi-antenna system, thereby allowing more flexible design and performance freedoms.

For all embodiments of the multi-band antenna array of the present disclosure, they can be used for both the transmission and reception of radio frequency (RF) signals. However, for the purposes of clarity, descriptions and examples are provided using only signals for transmission. Thus, those skilled in the art will understand that a consistent and reciprocal description would apply for the reception of RF signals. In addition, for the purposes of clarity, all antenna arrays described herein are deemed to be dual-crosspolarised in that they are two identical (or similar) arrays of orthogonal polarisations. In general, with respect each example, if only one of the two orthogonally polarised arrays is described in detail, it is assumed that those skilled in the art will understand that the same (or similar) arrangement and description of operation will apply to the orthogonal polarised array.

Similarly, for all embodiments, examples of RF distribution and phase-shifting networks are shown. However other feed network and phase shifting solutions exist in accordance with the present disclosure, including driving more or less antenna elements from more or less phase-shifted component signals of a RF distribution or feed network, for example, which would afford different design and cost trade-offs with respect to antenna performance parameters such tilt range and/or sidelobe level suppression. Thus, those skilled in the art will understand that different dimensions, number of antenna elements and/or other variations from those shown and described in illustrated embodiments are possible in accordance with other, further and different embodiments of the present disclosure.

The illustrated embodiments are designed to demonstrate that advantageous antenna element pitches, and array face topologies are achievable to accommodate all arrays in limited or constrained dimensions of a single antenna chassis and radome assembly. Such optimised antenna element pitches afford enhanced design flexibility in terms of antenna performance parameters such as tilt range, sidelobe levels, and isolation.

As an illustrative example, a cellular operator who currently operates services in either the 1800 MHz or 2100 MHz spectrum bands, or in both spectrum bands at a site, may need to also add the 2600 MHz spectrum band, in particular for macro cell sites. Prior approaches to upgrading cellular base station sites to support additional spectrum bands include adding additional single band antennas, swapping antennas for wideband antennas and swapping antennas for multi-band antennas. Using more single band antennas to support additional spectrum bands allows each spectrum band to be independently RF optimised and helps minimize potential inter-band, cross-band, and adjacent band interference issues. However, this may lead to increased site rental costs and increased wind load and may raise land zoning issues. On the other hand, changing to wideband antennas allows the operator to maintain the total number of antennas and feeder cables. Wideband antennas are typically those which can support a wide frequency range and thus cover a number of spectrum bands. For example, antennas which support the frequency range 1710-2690 MHz are popular wideband antennas as they cover the existing 1800 MHz and 2100 MHz bands plus the more recently issued 2600 MHz band in Europe. However, with such wideband antennas, each spectrum band needs to be combined prior to the antenna connection and hence each band cannot be optimised independently in terms of elevation tilt for example. In addition, as more spectrum and indeed power is combined onto a single wideband antenna, the potential for, and probability of inter-band interference issues increases. For instance, passive inter-modulation (PIM) interference arises due to the non-linear mixing of multiple spectral components in antenna line devices (such as feeders and antennas). Under certain power and Tx frequency combinations this can lead to PIM interference being created which may fall into the spectrum designed to support uplink channels, and hence de-sensitising base station receivers. A further disadvantage of wideband antennas is that while the radiating antenna elements in the array can be made to support a wide range of frequencies, the antenna array will not have an optimum array factor, i.e., the array will not have an optimised element pitch or inter-element spacing for all frequencies. This wide-banding of an antenna array will result in some performance trade-off such as gain, elevation pattern sidelobe levels, and/or limiting electrical tilt range.

In contrast, embodiments of the present disclosure include at least two antenna arrays, which are designed for transmission and reception of signals in two respective spectrum bands, and which are arranged such that at least one, but not all antenna elements are shared between the two spectrum bands. This arrangement has several advantages. For instance, in one example the two arrays are positioned adjacent to or co-axial with, for example, a third antenna array designed for operation in a third spectrum band, but which may dictate a preferred bound or maximum length of the overall multi-array antenna system. The present disclosure therefore allows the first and second antenna arrays to be of desired length and hence gain, and also to exploit optimal antenna spacing or pitch for a proportion of the array length, which affords design freedom for performance parameters such as tilt-range, and sidelobe level suppression. Embodiments of the present disclosure aim to consume what would otherwise be empty spaces within conventional multi-antenna system while minimizing component count, thereby allowing more flexible design and performance freedoms.

Embodiment 1

A first embodiment of the present disclosure is illustrated in FIG. 1, which supports a first spectrum band, e.g., 1710-2170 MHz with a second spectrum band, e.g., 2500-2690 MHz on a single antenna position at a base station site, when antenna width is required to be minimal. FIG. 1 depicts a dual array face topology design with two high-band arrays supporting two different high-band frequency ranges (e.g., high-band 1=1710-2170 MHz and high-band 2=2500-2690 MHz). The two high-band arrays are vertically stacked as one array on top of the other array. In one embodiment, the total length of the combined antenna arrays is between for example 1.8-2.2 m, and hence reflects a common length of base station antenna, or an available or maximum length. The two high-band arrays however share a number of common antenna elements which are located approximately half-way along the array. In one embodiment, the total array length for the high-band 1 antenna array is approximately 1.4 m and the high-band 2 antenna array is approximately 1.3 m, which are advantageous array lengths for such bands delivering the required directivity, vertical pattern beamwidth, and hence gain.

In the present example, each high-band array has its own independent corporate feed network and phase shifting network. As illustrated in FIG. 1, high-band antenna array 1 has an antenna element spacing (pitch) for most of its array length which is optimised for the range 1710-2170 MHz. High-band antenna array 2 has an antenna element pitch for most of its array length which is optimised for the range 2500-2690 MHz. The shared or common antenna elements can have an intermediate pitch, or a progressive pitch change. The shared antenna elements are connected to the two respective corporate feed and phase-shifting networks via diplexing filters, which in one example may have isolated pass-bands of 1710-2170 MHz and 2500-2690 MHz. Since each high-band array uses more optimal element pitches than had the array been designed for wideband operation over the entire 1710-2690 MHz range, an improvement in tilt range, gain and sidelobe levels will be achievable. The two high-band arrays, with a proportion of shared antenna elements also offers an optimised solution for maximising isolation between the two high-band arrays, whilst achieving desired gain, for example to ensure optimal inter-band interference such as PIM interference. Maximum isolation in a single shared radome could be achieved by not using any shared or common antenna elements, but this means shorter array lengths and hence gains.

Embodiment 2

Figure 2:
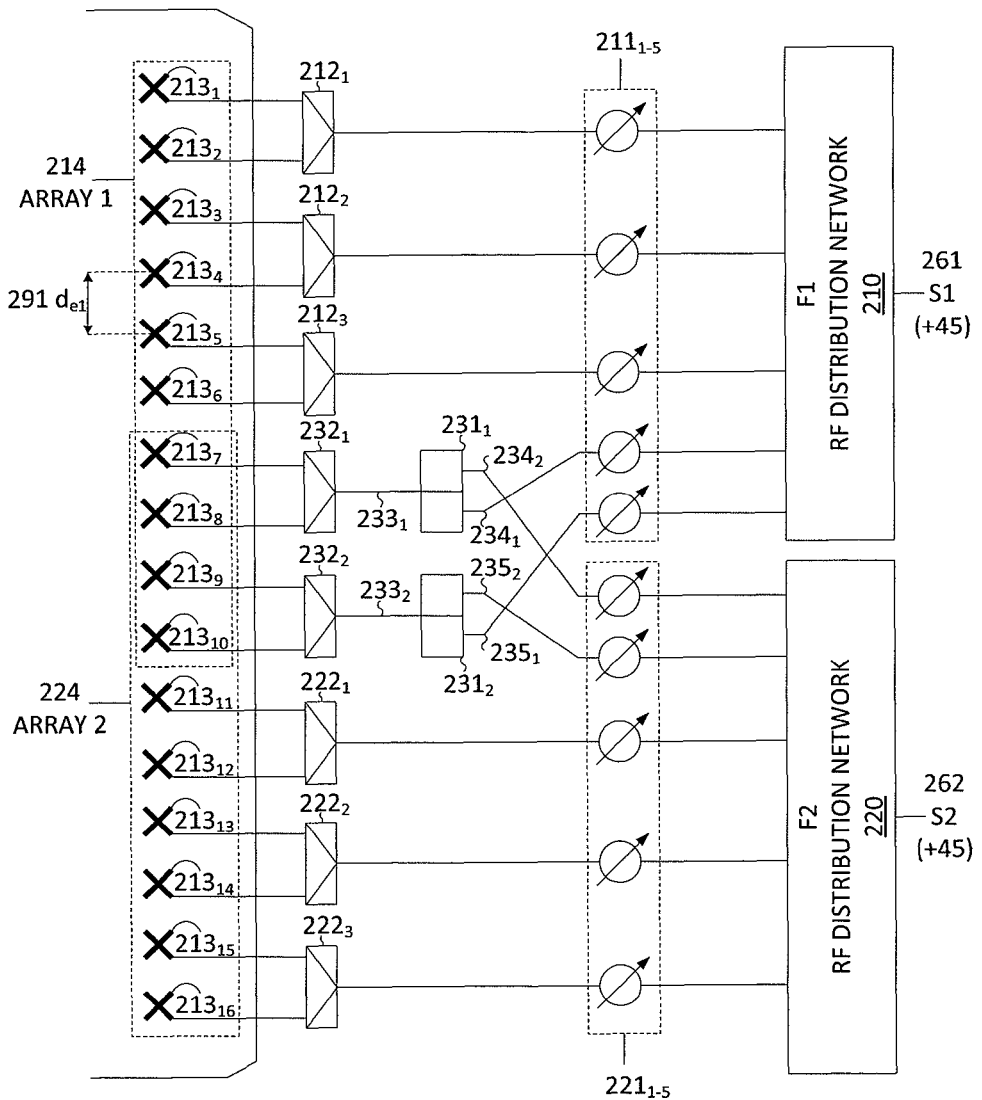
FIG. 2 depicts a dual cross-polarised antenna array topology, e.g., for operation in the 1900 MHz and Advanced Wireless Services (AWS) bands, according to the present disclosure.

The example of FIG. 2 is similar to the first embodiment but takes two high-band arrays which have the same element pitch and hence designed to cover different yet similar range of spectrum bands and frequencies. The example of FIG. 2 may be particularly useful for regions or for cellular networks which do not need to support an extended range of spectrum bands. An example might include the North American region with a focus upon 1900 MHz and Advanced Wireless Services (AWS: 1700 MHz uplink and 2100 MHz downlink) spectrum bands. In this embodiment, there is no need to accommodate for example the 2600 MHz band, and therefore two high-band arrays, each capable of covering 1710-2170 MHz would suffice. The common or shared antenna elements between the two high-band arrays use 1900/AWS diplex filters which are fed from separate 1900 only, and AWS only, corporate feed and phase shifting networks. Again, since only a proportion of antenna elements are used to support both 1900 and AWS spectrum bands, there is a much reduced probability of generating cross-band PIM Interference. Although 1900 MHz and AWS bands could be independently tilted whilst sharing the same physical array, because the AWS and 1900 MHz spectrum is combined at all the antenna elements there would be less isolation and hence PIM interference protection afforded when compared to the present disclosure and embodiments. In addition, although separate arrays may be ideal, where there is a limit on the maximum length of the antenna array, e.g., less than 2.7 m, embodiments of the present disclosure achieve advantageous overall performance considering a variety of available lengths which may be between the length of a single array and the length of two arrays vertically stacked, and where antenna width is required to be minimal.

Embodiment 3

Figure 3:
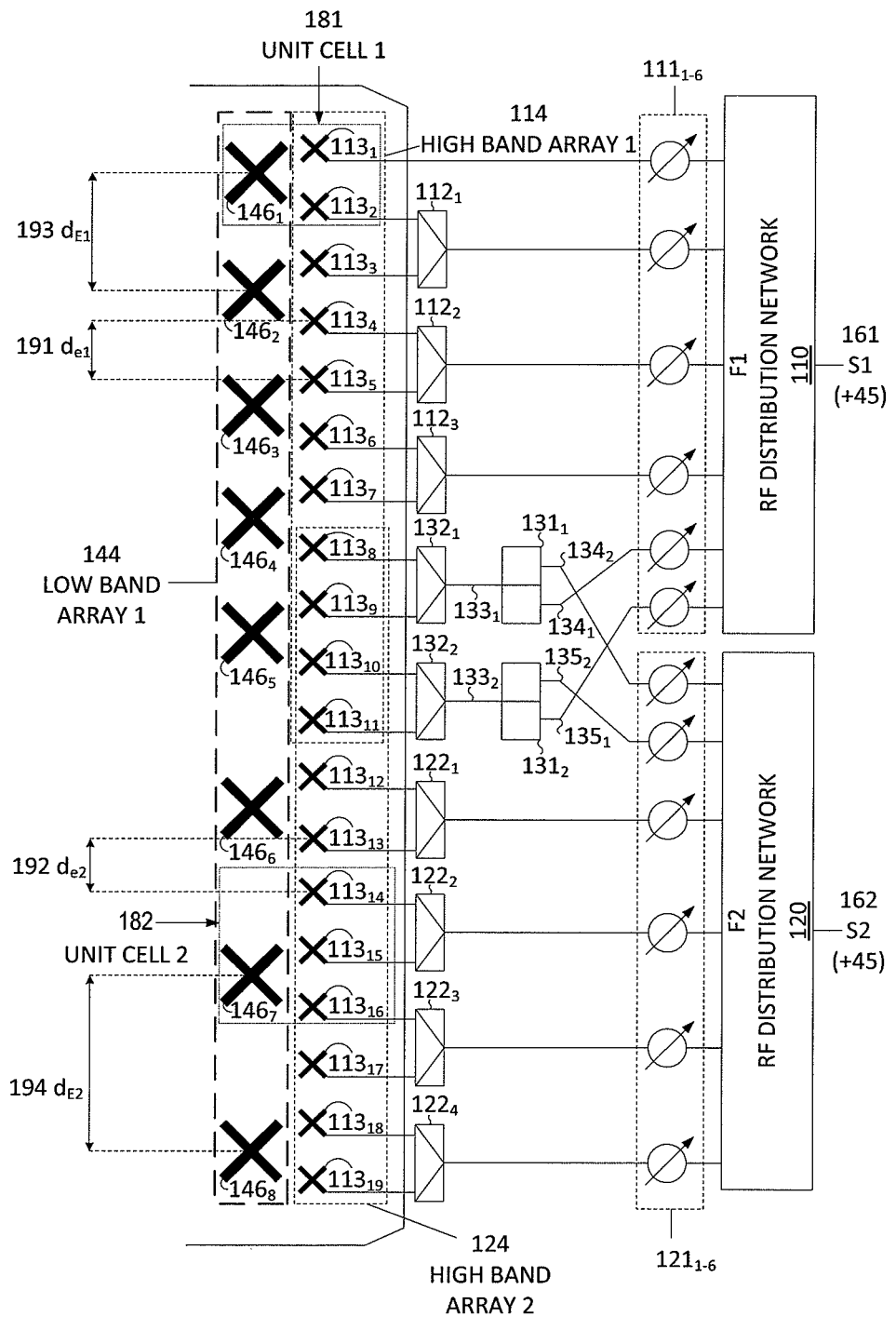
FIG. 3 depicts a triple cross-polarised antenna array topology, e.g., for operation in the 790-960 MHz, 1710-2170 MHz and 2600 MHz spectrum bands, according to the present disclosure.

In a third example, FIG. 3 depicts a triple array face topology design with a low-band array supporting a low-band range of spectrum bands (e.g., 790-960 MHz) plus two high-band arrays supporting two different high-band frequency ranges (e.g., high-band 1=1710-2170 MHz and high-band 2=2500-2690 MHz). The two high-band arrays are arranged as described for the first embodiment, positioned one array on top of the other array, and which are horizontally disposed to one side of the low-band array. The low-band array is of a length, e.g., 1.8-2.2 m, which is a common length of a base station antenna. The two high-band arrays share a number of common antenna elements which are located approximately half-way along the array length. In one embodiment, the total array length for the high-band 1 array is approximately 1.4 m and the high-band 2 array is approximately 1.3 m, which are array lengths for such bands delivering the required directivity, vertical pattern beamwidth, and hence gain.

The example of FIG. 3 also uses antenna element pitches which maximise a repeating "unit cell" topology along the array face of the triple array aperture. For example, for the high-band 1 antenna array (e.g., for 1710-2170 MHz) an element pitch which is 1:2 of the element pitch of the low-band antenna array is used for all non-shared high-band antenna elements. For the high-band 2 antenna array (e.g., 2500-2690 MHz) an element pitch which is 1:3 of the element pitch of the low-band array is used for all non-shared high-band antenna elements. The low-band array may also use a different element pitch for those low-band elements which are adjacent to high-band 1 antenna array, and for those low-band elements which are adjacent to high-band 2 antenna array. For the region where there are shared antenna elements between both high-band arrays, the element pitch ratios may depart from precise integer ratios.

Embodiment 4

Figure 4:
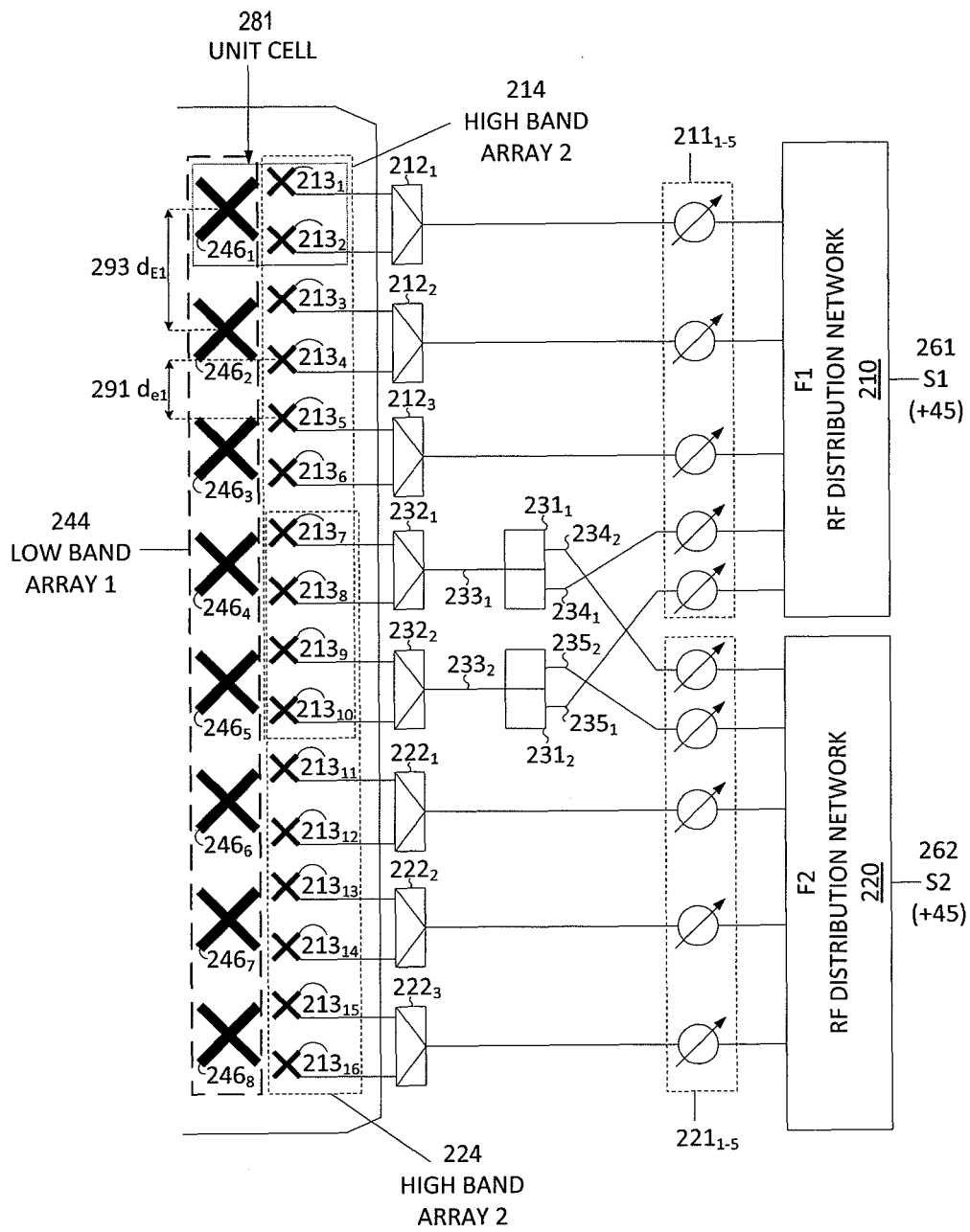
FIG. 4 depicts a triple cross-polarised antenna array topology, e.g., for operation in the 698-894 MHz, 1900 MHz and AWS spectrum bands, according to the present disclosure.

The example of FIG. 4 is similar to the third embodiment, but using the high-band arrays described in the second embodiment, which are designed to have the same antenna element pitch. FIG. 4 depicts a triple array face topology design with a low-band array supporting a low-band range of spectrum bands (e.g., 698-894 MHz) plus two high-band arrays supporting two similar high-band frequency ranges (e.g., high-band 1=1710-1755/2110-2155 MHz and high-band 2=1850-1990 MHz). FIG. 4 also shows a "unit cell" repeating array topology design exploited along the triple-array structure, where the element pitch of the high-band arrays is 1:2 of the low-band arrays.

Embodiment 5

Figure 5:
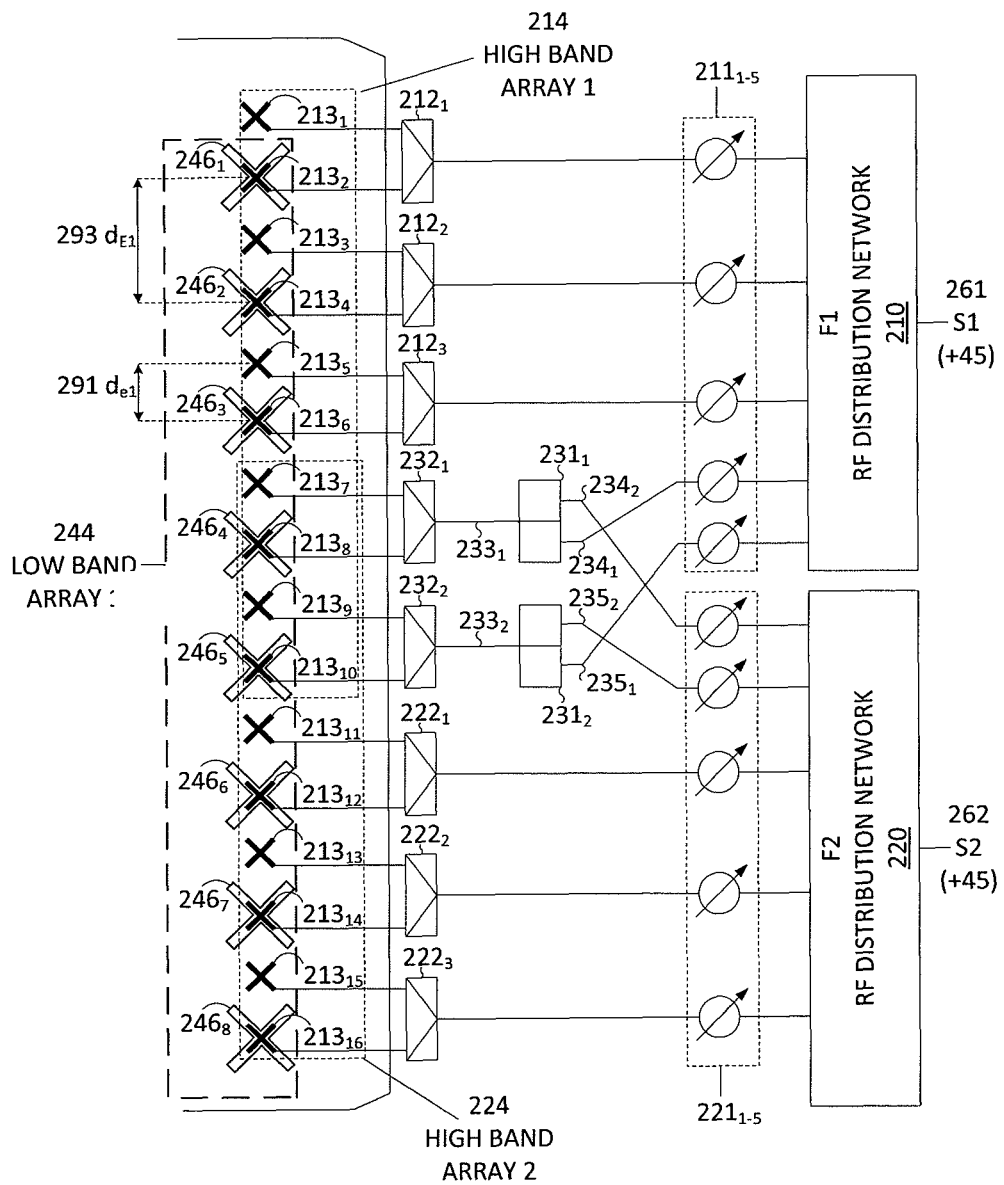
FIG. 5 depicts a triple cross-polarised antenna array topology, e.g., for operation in the 698-894 MHz, 1900 MHz and AWS spectrum bands, according to the present disclosure.

FIG. 5 illustrates a fifth embodiment comprising aspects of the fourth embodiment where, instead of deploying the high-band arrays to one side of the low-band array, they are deployed on top of the low-band array in a co-axial manner. As such, low-band elements share the same position as some of the high-band elements, and can for example be dual-band elements. The advantage of this embodiment is that it further maximises symmetry along the antenna aperture face which can allow improvements in azimuth radiation pattern symmetry and squint characteristics. A further advantage is that it optionally enables the overall aperture width to be minimized.

Embodiment 6

Figure 6:
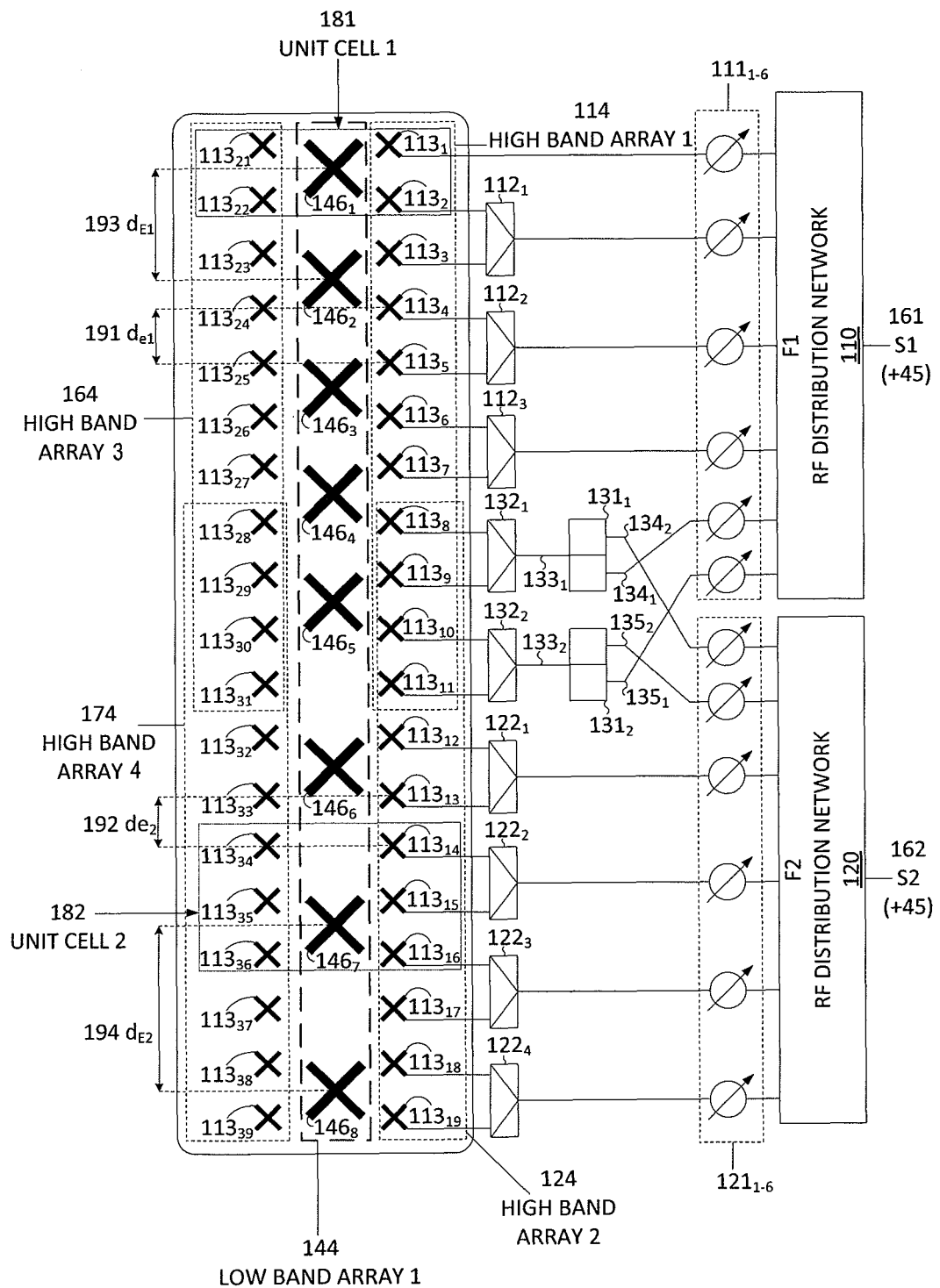
FIG. 6 depicts a pentuple (5×) cross-polarised antenna array topology, e.g., for operation in the 790-960 MHz, 1710-2170 MHz and 2600 MHz spectrum bands, according to the present disclosure.

A sixth embodiment is shown in FIG. 6 and comprises aspects of the third embodiment with a third high-band array and a fourth high-band array added. The third high-band array and the fourth high-band array are identical or similar to the first high-band array and second high-band array, respectively. These additional high-band arrays are deployed in the horizontal plane and topologically on the other side and hence also adjacent to the low-band array thus creating five arrays in total.

Embodiment 7

Figure 7:
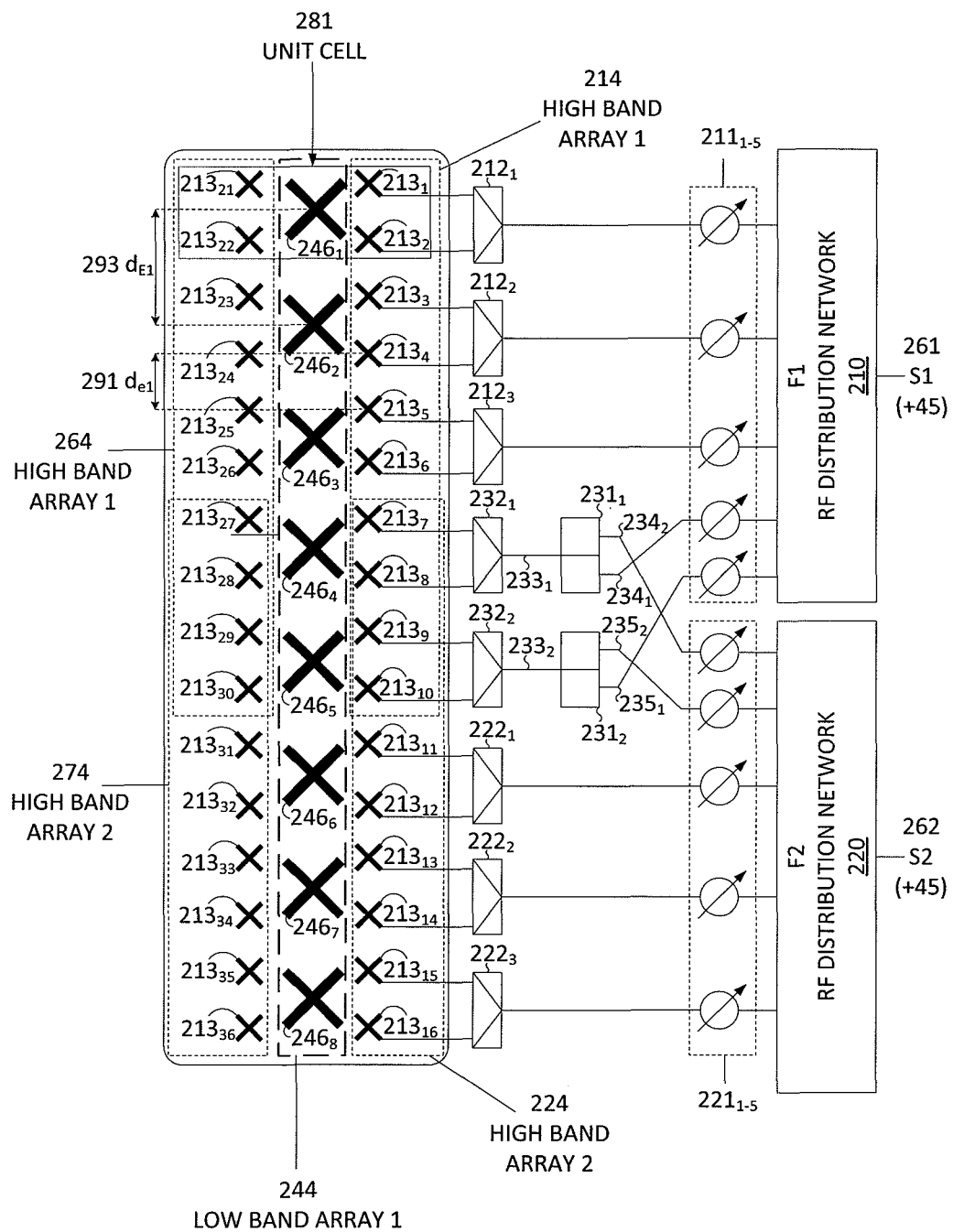
FIG. 7 depicts a pentuple (5×) cross-polarised antenna array topology, e.g., for operation in the 790-960 MHz, 1710-2170 MHz and 2600 MHz spectrum bands, according to the present disclosure.

A seventh embodiment, shown in FIG. 7, comprises aspects of the fourth embodiment and adds a third high-band array and a fourth high-band array, which are identical or similar to the first high-band array and second high-band array, respectively. These additional high-band arrays are deployed in the horizontal plane and topologically on the other side and hence also adjacent to the low-band array thus creating five arrays in total.

The sixth and seventh embodiments each comprise a triple array topology which uses the shared high-band antenna array approaches described in the first and second embodiments respectively. The advantage of these particular embodiments is that further arrays are provided which can be used for additional "on-air" combining of base station capacity (for example another mobile operator), provide additional receive ports to exploit higher-order receive diversity gain or indeed higher order transmit diversity and higher order spatial multiplexing when considering the wider Multiple In-Multiple Out (MIMO) schemes available with radio technologies such as Long Term Evolution (LTE) and LTE-Advanced.

Each of these embodiments is described in greater detail below in connection with the respective FIGS. 1-7.

A first embodiment of the present disclosure is illustrated in FIG. 1. This depicts a dual array topology design (100) having antenna elements ($113_1$-$113_{19}$). The dual array topology design (100) includes two high-band cross-polarised antenna arrays (114, 124) supporting two different high-band frequency ranges (e.g., high-band 1=1710-2170 MHz and high-band 2=2500-2690 MHz). The two high-band arrays are vertically disposed, positioned one array on top of the other array. High-band antenna array 1 (114) comprises cross-polarised antenna elements $113_1$-$113_{11}$ and high-band antenna array 2 (124) comprises cross-polarised antenna elements $113_8$-$113_{19}$. The antenna elements $113_8$-$113_{11}$ are therefore common, or shared between both high-band arrays.

Signal S1, labeled as (161), represents the RF signal(s) intended for transmission via high-band array 1 in the frequency range 1710-2170 MHz. Signal S2, labeled as (162) represents the RF signal(s) intended for transmission via high-band array 2 in the frequency range 2500-2690 MHz.

Signal, S1 is connected to an antenna RF corporate feed or distribution feed network (110), which divides up the input RF signal power into 6× component signals of S1, which in turn are connected to 6× phase shifting devices ($111_{1-6}$), which are designed to operate to impose a variable phase delay profile across the array of antenna elements of high-band antenna array 1, to permit a variable electrical beam tilt control function for the signal S1. Together, the distribution feed network (110) and the set of phase shifting devices ($111_{1-6}$) may broadly be referred to as an RF distribution and phase-shifting network. The phase-shifted component signals of S1 are connected to high-band antenna array 1 of antenna elements, $113_1$-$113_{11}$. Specifically, it is shown that antenna element $113_1$ is driven directly from a phase-shifted first component signal of S1, whereas elements $113_2$ and $113_3$ are driven via a phase-shifted second component signal of S1 which has been split into two further component signals via a RF splitting device ($112_1$). Similarly, elements $113_4$ and $113_5$ are driven in a similar manner, from a third phase-shifted component signal of S1, which has been split into two further component signals via RF splitting device ($112_2$), as are elements $113_6$ and $113_7$, which are driven from a fourth phase-shifted component signal of S1, which is split into two further component signals via RF splitting device ($112_3$). Elements $113_8$ and $113_9$ are driven from an RF splitting device ($132_1$) which is driven from the common port of a diplexing filter ($131_1$). The diplexing filter ($131_1$) has two input ports; a first input port ($134_1$) for passing signals with pass-band 1710-2170 MHz and a second input port ($134_2$) for passing signals with pass-band 2500-2690 MHz. The first input port ($134_1$) of the diplexing filter ($131_1$) is connected to the fifth phase-shifted component signal of S1. Elements $113_{10}$ and $113_{11}$ are driven from an RF splitting device ($132_2$) which is driven from the common port ($133_2$) of a diplexing filter ($131_2$). The diplexing filter ($131_2$) has two input ports; one input port ($135_1$) for pass-band 1710-2170 MHz and a second input port ($135_2$) for pass-band 2500-2690 MHz. The first input port ($135_1$) of the diplexing filter ($131_2$) is connected to the sixth phase-shifted component signal of S1.

Signal, S2 is connected to an antenna RF corporate feed or distribution feed network (120), which divides up the input RF signal power into 6× component signals of S2, which in turn are connected to 6× phase shifting devices ($121_{1-6}$), which are designed to operate to impose a variable phase delay profile across the array of antenna elements of high-band antenna array 2, to permit a variable electrical beam tilt control function for the signal S2. Together, the distribution feed network (120) and the set of phase shifting devices ($121_{1-6}$) may broadly be referred to as an RF distribution and phase-shifting network. The phase-shifted component signals of S2 are connected to high-band antenna array 2 denoted by antenna elements, $113_8$-$113_{19}$. Specifically, it is shown that antenna elements $113_8$ and $113_9$ are driven from an RF splitting device ($132_1$) which is driven from the common port ($133_1$) of a diplexing filter ($131_1$). The second input port ($134_2$) of the diplexing filter ($131_1$) is connected to the first phase-shifted component signal of S2. Elements $113_{10}$ and $113_{11}$ are driven from an RF splitting device ($132_2$) which is driven from the common port ($133_2$) of a diplexing filter ($131_2$). The second input port ($135_2$) of the diplexing filter ($131_2$) is connected to the second phase-shifted component signal of S2. Antenna elements $113_{12}$ and $113_{13}$ are driven via a phase-shifted third component signal of S2 which has been split into two further component signals via a RF splitting device ($122_1$). Similarly, elements $113_{14}$ and $113_{15}$ are driven from a fourth phase-shifted component signal of S2 which has been split into two further component signals via RF splitting device ($122_2$), as are elements $113_{16}$ and $113_{17}$, which are driven from a fifth phase-shifted component signal of S2 which have been split into two further component signals via RF splitting device ($122_3$). Finally, antenna elements $113_{18}$ and $113_{19}$ are driven in a similar manner, from RF splitting device ($122_4$) from a sixth phase-shifted component signal of S2.

Although precise dimensions of the antenna arrays are not shown in FIG. 1, in one example the total array length of the "combined array" of 19× antenna elements is designed to reflect a total antenna radome length of between 1.8-2.2 m, depending upon specific element spacing distances, and hence reflects a preferred, typical or common length of base station antenna, or indeed a maximum available length. This is particularly useful if, for example, an antenna length of up to 2.2 m is permitted, but with a restricted antenna width, e.g., 200 mm (thus denying a conventional side-by-side dual-array antenna), and where a common tilt is not acceptable and maximum isolation is required between spectrum bands. In one example, the total array length for the high-band antenna array 1 is approximately 1.4 m and the total array length for the high-band antenna array 2 is approximately 1.3 m. These exemplary array lengths again reflect a common array length for such bands delivering the required directivity, vertical pattern beamwidth, and hence gain.

In one example, the antenna element spacing (pitch) for high-band 1, $d_{e1}$ (labeled as (191) in FIG. 1) for elements $113_1$-$113_7$, and hence most of the array length of high-band antenna array 1, is designed to be optimised for the range 1710-2170 MHz, and might be for example 130 mm, which is approximately 0.85λ, at centre frequency of the high-band 1. This represents an advantageous element spacing design value for such a range of frequencies, which in turn permits sufficient design freedoms to optimise tilt range, sidelobe level suppression and manageable mutual coupling between elements. In addition, in one example the antenna element spacing (pitch) for high-band 2, $d_{e2}$ (labeled as (192) in FIG. 1) for elements 113$_{12}$-113$_{19}$, and hence most of the array length of high-band antenna array 2, is designed to be optimised for the range 2500-2690 MHz, and might be for example 100 mm, which again is approximately 0.85λ, at centre frequency of the high-band 2. This represents an advantageous element spacing design value for such a range of frequencies, which in turn permits sufficient design freedoms to optimise tilt range, sidelobe level suppression and manageable mutual coupling between elements. In addition, in one example the shared or common high-band antenna elements 113$_8$-113$_{11}$ can have an intermediate pitch, or a progressive pitch change between for example 130 mm and 100 mm. Since each high-band antenna array uses a more optimal element pitch than had the array been designed for wideband operation over the entire 1710-2690 MHz range, an improvement in tilt range, gain and sidelobe levels will be achievable.

The diplexing filters (131$_1$ and 131$_2$), may introduce additional phase delay which may affect the tilt-range and sidelobe levels. Furthermore, such diplexing filters may introduce varying phase delays for different frequencies of input signal. Therefore, in one embodiment the diplexing filters are selected to have desirable group delay characteristics and specifications. Although not shown, in one embodiment identical diplexing filter devices are used to drive all high-band antenna elements. For instance, this would mean inserting a diplexing filter into the other four phase-shifted component signals of S1 and similarly for the other four phase-shifted component signals of S2 in order for elements 113$_1$-113$_7$ and 113$_{12}$-113$_{19}$ to receive the same group delay characteristics as the shared or common high-band antenna elements, $e_8$-$e_{11}$.

The two high-band arrays, having several shared antenna elements, i.e. 113$_8$-113$_{11}$ in the example of FIG. 1, offer an optimised solution for maximising isolation between high-band arrays, whilst achieving desired gain, for example to ensure optimal inter-band or cross-band interference such as PIM interference. Maximum isolation in a single shared radome could be achieved by not using any shared antenna elements, but this means shorter array lengths and hence gains.

A second embodiment of the present disclosure is illustrated in FIG. 2. This depicts a dual array topology design (200) having antenna elements (213$_1$-213$_{16}$). Dual array topology design (200) includes two high-band cross-polarised antenna arrays (214, 224) designed to support two different yet similar high-band frequency ranges (e.g., high-band 1=split as 1710-1755 MHz/2110-2155 MHz and high-band 2=1850-1990 MHz). The two high-band arrays are vertically disposed, positioned one on top of the other. High-band antenna array 1 (214) comprises cross-polarised antenna elements 213$_1$-213$_{10}$ and high-band antenna array 2 (224) comprises cross-polarised antenna elements 213$_7$-213$_{16}$. The antenna elements 213$_7$-213$_{10}$ are therefore common, or shared between both high-band arrays.

Signal S1, also labeled as (261), represents the RF signal(s) intended for transmission via high-band antenna array 1, e.g., in the frequency range 1710-1755 MHz/2110- 2155 MHz, or more commonly known as the Advanced Wireless Services (AWS) band in the US, Canada, and elsewhere. Signal S2, also labeled as (262), represents the RF signal(s) intended for transmission via high-band antenna array 2, e.g., in the frequency range 1850-1990 MHz, or more commonly known as the Personal Communications Services (PCS) band in the US, Canada, and elsewhere.

Signal, S1 is connected to an antenna RF corporate feed or distribution feed network (210), which divides up the input RF signal power into 5× component signals of S1, which in turn are connected to 5× phase shifting devices (211$_{1-5}$), which are designed to operate to impose a variable phase delay profile across the array of antenna elements of high-band antenna array 1, to permit a variable electrical beam tilt control function for the signal S1. Together, the distribution feed network (210) and the set of phase shifting devices (211$_{1-5}$) may broadly be referred to as an RF distribution and phase-shifting network. The phase-shifted component signals of S1 are connected to high-band antenna array 1 denoted by antenna elements, 213$_1$-213$_{10}$. Specifically, it is shown that elements 213$_1$ and 213$_2$ are driven via a phase-shifted first component signal of S1 which has been split into two further component signals via a RF splitting device (212$_1$). Similarly, elements 213$_3$ and 213$_4$ are driven in a similar manner, from a second phase-shifted component signal of S1, which has been split into two further component signals via RF splitting device (212$_2$), as are elements 213$_5$ and 213$_6$, which are driven from a third phase-shifted component signal of S1, which is split into two further component signals via RF splitting device (212$_3$). Elements 213$_7$ and 213$_8$ are driven from an RF splitting device (232$_1$) which is driven from the common port (233$_1$) of a diplexing filter (231$_1$). The diplexing filter (231$_1$) has two input ports; a first input port (234$_1$) for passing signals with pass-bands 1710-1755 MHz and 2110-2155 MHz, and a second input port (234$_2$) for passing signals with pass-band 1850-1990 MHz. The first input port (234$_1$) of the diplexing filter (231$_1$) is connected to the fourth phase-shifted component signal of S1. Elements 213$_9$ and 213$_{10}$ are driven from an RF splitting device (232$_2$) which is driven from the common port (233$_2$) of a diplexing filter (231$_2$). The diplexing filter (231$_2$) has two input ports; one input port (235$_1$) for pass-band 1710-1755 MHz and 2110-2155 MHz, and a second input port (235$_2$) for passing signals with pass-band 1850-1990 MHz. The first input port of the diplexing filter (231$_2$) is connected to the fifth phase-shifted component signal of S1.

Signal, S2 is connected to an antenna RF corporate feed or distribution feed network (220), which divides up the input RF signal power into 5× component signals of S2, which in turn are connected to 5× phase shifting devices (221$_{1-5}$), which are designed to operate to impose a variable phase delay profile across the array of antenna elements of high-band antenna array 2, to permit a variable electrical beam tilt control function for the signal S2. Together, the distribution feed network (220) and the set of phase shifting devices (221$_{1-5}$) may broadly be referred to as an RF distribution and phase-shifting network The phase-shifted component signals of S2 are connected to high-band antenna array 2 (224) denoted by antenna elements, 213$_7$-213$_{16}$. Specifically, it is shown that antenna elements 213$_7$ and 213$_8$ are driven from an RF splitting device (232$_1$) which is driven from the common port (233$_1$) of a diplexing filter (231$_1$). The second input port (234$_2$) of the diplexing filter (231$_1$) is connected to the first phase-shifted component signal of S2. Elements 213$_9$ and 213$_{10}$ are driven from an RF splitting device (232$_2$) which is driven from the common port (233$_2$)

of a diplexing filter ($231_2$). The second input port ($235_2$) of the diplexing filter ($231_2$) is connected to the second phase-shifted component signal of S2. Antenna elements $213_{11}$ and $213_{12}$ are driven via a phase-shifted third component signal of S2 which has been split into two further component signals via a RF splitting device ($222_1$). Similarly, elements $213_{13}$ and $213_{14}$ are driven from a fourth phase-shifted component signal of S2 which has been split into two further component signals via RF splitting device ($222_2$), as are elements $213_{15}$ and $213_{16}$, which are driven from a fifth phase-shifted component signal of S2 which have been split into two further component signals via RF splitting device ($222_3$).

Although precise dimensions of the antenna arrays are not shown in FIG. 2, in one embodiment the total antenna chassis and radome length is between 1.8-2.2 m, depending upon specific element spacing distances. This reflects a common length of base station antenna. In one embodiment, the total array length for the combined array comprising both the high-band 1 and high-band 2 antenna arrays is approximately 1.3 m, and again reflects a common array length for such bands to deliver the required directivity, vertical pattern beamwidth, and hence gain. In one embodiment, the antenna element spacing (pitch) for high-band antenna array 1 and for high-band antenna array 2, is the same, $d_{e1}$ (labeled as (291) in FIG. 2) for all elements $213_1$-$213_{16}$. The high-band antenna element pitch might for example be optimal around 130 mm, which is approximately $0.85\lambda$, at the centre frequencies of both the high-band 1 and high-band 2 antenna arrays. This represents an advantageous element spacing design value for such a range of frequencies, which in turn permits sufficient design freedoms to optimise tilt range, sidelobe level suppression and manageable mutual coupling between elements.

The design of the diplexing filters ($231_1$ and $231_2$), may introduce additional phase delay which may affect, for example, the tilt-range and sidelobe levels. Furthermore, such diplexing filters may introduce varying phase delays for different frequencies of input signal. Thus, in one embodiment, the diplexing filters are selected to have desirable group delay characteristics and specifications. Although not shown, in one embodiment identical (or similar) diplexing filter devices are used to drive all high-band antenna elements. For instance, this would mean inserting a diplexing filter into the other four phase shifted component signals of S1 and similarly for the other four phase-shifted component signals of S2 in order for elements $213_1$-$213_6$ and $213_{11}$-$213_{16}$ to receive the same group delay characteristics as the shared or common high-band antenna elements, $213_7$-$213_{10}$.

The two high-band arrays, with several shared antenna elements, i.e. $213_7$-$213_{10}$ in this embodiment also offer an optimised solution for maximising isolation between high-band arrays, while achieving desired gain, for example to ensure optimal inter-band or cross-band interference such as PIM interference. Although maximum isolation in a single shared radome could be achieved by not using any shared antenna elements, this means shorter array lengths and hence gains.

A third embodiment of the present disclosure is illustrated in FIG. 3. This depicts a triple array topology design (300) having cross-polarized low-band antenna elements ($146_1$-$146_8$), and cross-polarized high-band antenna elements ($113_1$-$113_{19}$). In particular, the triple array topology design (300) includes a low-band cross-polarised antenna array (144), also labeled in FIG. 3 as low-band array 1, and comprising cross-polarised low-band antenna elements $146_1$-$146_8$, which support a low-band range of spectrum bands (e.g., 790-960 MHz) plus two high-band cross-polarised antenna arrays (114, 124) supporting two different high-band frequency ranges (e.g., high-band 1=1710-2170 MHz and high-band 2=2500-2690 MHz). The two high-band antenna arrays are as described in the first embodiment (FIG. 1), which are disposed to one side of the low-band array. High-band antenna array 1 (114) comprises cross-polarised antenna elements $113_1$-$113_{11}$ and high-band antenna array 2 (124) comprises cross-polarised antenna elements $113_8$-$113_{19}$. The antenna elements $113_8$-$113_{11}$ are therefore common, or shared between both high-band arrays.

Signal S1, also labeled as (161), represents the RF signal(s) intended for transmission via high-band antenna array 1, e.g., in the frequency range 1710-2170 MHz. Signal S2, also labeled as (162), represents the RF signal(s) intended for transmission via high-band antenna array 2, e.g., in the frequency range 2500-2690 MHz. The description of how signals S1 and S2 are processed and details of the high-band antenna arrays are described in connection with the example of FIG. 1.

For clarity and ease of understanding, the RF distribution or feed network for the low-band array of antenna elements is not shown. Thus, those skilled in the art will understand that a conventional distribution and phase shifting network may be used to convey low-band signals. Although precise dimensions of the antenna arrays are not shown in FIG. 3, in one embodiment the low-band antenna array of 8× antenna elements is designed to reflect a total antenna chassis/radome length of between 1.8-2.2 m, depending upon antenna element spacing, which reflects a common length of a base station antenna. In FIG. 3, the spacing between low-band elements are shown as $d_{E1}$ and $d_{E2}$, also labeled as (193, 194) respectively. The particular antenna element pitches that are selected allow a repeating "unit cell" topology, along the array face of the triple array aperture. A first "unit cell" 181 comprises a low-band antenna element and two high-band 1 antenna elements. For instance, the exemplary unit cell (181) comprises low-band element $146_1$ and high-band 1 antenna elements $113_1$ and $113_2$. In one embodiment, the antenna element pitch $d_{e1}$, also labeled as (191), of 130 mm for the non-shared elements $113_1$-$113_7$ of high-band antenna array 1 (1710-2170 MHz) is 1:2 relative to the element pitch, $d_{E1}$ of the adjacent and corresponding low-band antenna array of elements, and hence may be 260 mm. This applies to low-band elements $146_1$ to $146_3$. Similarly, a second "unit cell" 182 comprises a low-band antenna element and three high-band 2 antenna elements. For instance, the exemplary unit cell 182 comprises low-band element $146_7$ and high-band 2 antenna elements $113_{14}$, $113_{15}$ and $113_{16}$. In one embodiment, the antenna element pitch $d_{e2}$, also labeled as (192), is 100 mm for the non-shared antenna elements $113_{12}$-$113_{19}$ of high-band 2 antenna array (2500-2690 MHz) and is 1:3 relative to the element pitch, $d_{E2}$ of the adjacent and corresponding low-band antenna array of elements, and hence may be 300 mm. This applies to low-band elements $146_5$ to $146_8$. The antenna element pitch between low-band antenna elements $146_3$ and $146_4$, and $146_4$ and $146_5$ which are adjacent to the shared high-band antenna elements can use an intermediate pitch value (e.g., 280 mm) or a progressive pitch change. Overall, the low-band array will have an average low-band antenna element pitch of approximately 280 mm, which is about $0.82\lambda$, at the centre frequency of the low-band array (e.g., 790-960 MHz), and represents an excellent value for optimising tilt range, sidelobe levels, and management of inter-element mutual coupling. The "unit cell" approach also allows more flexibility in overall design, especially for different variants of triple array antenna, for example for accommodating different overall length or gain antennas.

A fourth embodiment of the present disclosure is illustrated in FIG. 4. This depicts a triple array topology design (400) having cross-polarized low-band antenna elements (246$_1$-246$_8$) and cross-polarized high-band antenna elements (213$_1$-213$_{16}$). In particular, the triple array topology design (400) includes a low-band cross-polarised antenna array (244), also labeled as low-band array 1, and comprising cross-polarised low-band antenna elements 246$_1$-246$_8$, which support a low-band range of spectrum bands (e.g., 698-894 MHz) plus two high-band cross-polarised antenna arrays (214, 224) designed to cover two different yet similar high-band frequency ranges (e.g., high-band 1=split as 1710-1755 MHz/2110-2155 MHz and high-band 2=1850-1990 MHz). The two high-band arrays are as described in the second embodiment (FIG. 2), and are disposed to one side of the low-band array. High-band antenna array 1 (214) comprises cross-polarised antenna elements 213$_1$-213$_{10}$ and high-band antenna array 2 (224) comprises cross-polarised antenna elements 213$_7$-213$_{16}$. The antenna elements 213$_7$-213$_{10}$ are therefore common, or shared between both high-band arrays.

Signal S1, also labeled as (261), represents the RF signal(s) intended for transmission via high-band antenna array 1, e.g., in the frequency range 1710-1755 MHz/2110-2155 MHz, or more commonly known as the Advanced Wireless Services (AWS) band in the US, Canada, and elsewhere. Signal S2, also labeled as (262), represents the RF signal(s) intended for transmission via high-band antenna array 2, e.g., in the frequency range 1850-1990 MHz, or more commonly known as the Personal Communications Services (PCS) band in the US, Canada, and elsewhere. The description of how signals, S1 and S2 are processed and details of the high-band arrays are described in connection with the example of FIG. 2.

For clarity and ease of understanding, the RF distribution or feed network for the low-band array of antenna elements is not shown. Thus, those skilled in the art will understand that a conventional distribution and phase shifting network may be used to convey low-band signals. Although precise dimensions of the antenna arrays are not shown in FIG. 4, in one embodiment the low-band array of 8× antenna elements is designed to reflect a total antenna radome length of between 1.8-2.2 m, depending upon antenna element spacing, which reflects a common length of a base station antenna. In FIG. 4, the spacing between low-band elements is shown as d$_{E1}$, also labeled as (293). The particular antenna element pitches have also been designed to allow a repeating "unit cell" topology, along the array face of the triple array aperture. An example "unit cell" 281 comprises a low-band antenna element and two high-band antenna elements, e.g., low-band element 246$_1$ and high-band antenna array 1 elements 213$_1$ and 213$_2$. In one embodiment, the antenna element pitch, d$_{e1}$, also labeled as (291), is 130 mm for the high-band antenna array and is approximately 1:2 relative to the low-band antenna element pitch, d$_{E1}$ and hence d$_{E1}$=260 mm. This applies to low-band elements 246$_1$ to 246$_8$ and is about 0.7λ, at the centre frequency of the low-band array (e.g., 698-894 MHz), and represents a good value for optimising tilt range, sidelobe levels, and management of inter-element mutual coupling. The "unit cell" approach also allows more flexibility in overall design, especially for different variants of triple array antenna, for example for accommodating different overall length or gain antennas.

A fifth embodiment of the present disclosure is illustrated in FIG. 5. This depicts a triple array topology design (500) having cross-polarized low-band antenna elements (246$_1$-246$_8$) and cross-polarized high-band antenna elements (213$_1$-213$_{16}$). In particular, the triple array topology design (500) includes a low-band cross-polarised antenna array (244), also labeled as low-band array 1, and comprising cross-polarised low-band antenna elements 246$_1$-246$_8$, which support a low-band range of spectrum bands (e.g., 698-894 MHz) plus two high-band cross-polarised antenna arrays (214, 224) designed to support two different yet similar high-band frequency ranges (e.g., high-band 1=split as 1710-1755 MHz/2110-2155 MHz and high-band 2=1850-1990 MHz). The example of FIG. 5 comprises the same design as the example of FIG. 4, apart from the fact that the high-band antenna arrays (214, 224) are deployed co-axially with the low-band antenna array (244). High-band antenna array 1 (214) comprises cross-polarised antenna elements 213$_1$-213$_{10}$ and high-band antenna array 2 (224) comprises cross-polarised antenna elements 213$_7$-213$_{16}$. The antenna elements 213$_7$-213$_{10}$ are therefore common, or shared between both high-band arrays.

Signal S1, also labeled as (261), represents the RF signal(s) intended for transmission via high-band antenna array 1, e.g., in the frequency range 1710-1755 MHz/2110-2155 MHz, or more commonly known as the Advanced Wireless Services (AWS) band in the US, Canada, and elsewhere. Signal S2, also labeled as (262), represents the RF signal(s) intended for transmission via high-band antenna array 2, e.g., in the frequency range 1850-1990 MHz, or more commonly known as the Personal Communications Services (PCS) band in the US, Canada, and elsewhere. The description of how signals, S1 and S2 are processed and details of the high-band arrays are described in connection with the example of FIG. 2.

In FIG. 5, the spacing between low-band elements is shown as d$_{E1}$, also labeled as (293). The particular antenna element pitches have also been designed to allow for a co-axial deployment of high-band arrays with the low-band array. In one embodiment, the antenna element pitch, d$_{e1}$, also labeled as (291) is 130 mm for the high-band antenna arrays and is approximately 1:2 relative to the low-band antenna element pitch, d$_{E1}$ and hence d$_{E1}$=260 mm. This applies to low-band antenna elements 246$_1$ to 246$_8$ and is about 0.7λ, at the centre frequency of the low-band array (e.g., 698-894 MHz), and represents a good value for optimising tilt range, sidelobe levels, and management of inter-element mutual coupling. The co-axial deployment approach also allows more flexibility in overall design, especially for different variants of triple array antenna, for example for accommodating different overall length or gain antennas, together with excellent azimuthal radiation pattern symmetry and minimal overall width of the multi-band array antenna solution.

A sixth embodiment of the present disclosure is illustrated in FIG. 6 which depicts an array topology design (600) having cross-polarized low-band antenna elements (146$_1$-146$_8$) and cross-polarized high-band antenna elements (113$_1$-113$_{39}$). The array topology design (600) is similar to the example of FIG. 3 with two additional identical high-band antenna arrays. In particular, array topology design (600) includes 5× arrays with a central low-band cross-polarised antenna array (144), also labeled as low-band array 1, and comprising cross-polarised low-band antenna elements 146$_1$-146$_8$, which support a low-band range of spectrum bands (e.g., 790-960 MHz) plus two high-band cross-polarised antenna arrays (114, 124) supporting two different high-band frequency ranges (e.g., high-band 1=1710-2170 MHz and high-band 2=2500-2690 MHz), which are disposed to one side of the low-band array, plus another two identical (or similar) high-band cross-polarised antenna arrays (164, 174) supporting the same high-band frequency ranges as the first two high-band arrays (e.g., high-band 3=1710-2170 MHz and high-band 4=2500-2690 MHz), which are disposed on the other side of the low-band array.

High-band antenna array 1 (114) comprises cross-polarised antenna elements $113_1$-$113_{11}$ and high-band antenna array 2 (124) comprises cross-polarised antenna elements $113_8$-$113_{19}$. The antenna elements $113_8$-$113_{11}$ are therefore common, or shared between high-band array 1 and high-band array 2. High-band antenna array 3 (164) comprises cross-polarised antenna elements $113_{21}$-$113_{31}$ and high-band antenna array 4 (174) comprises cross-polarised antenna elements $113_{28}$-$113_{39}$. The antenna elements $113_{28}$-$113_{31}$ are therefore common, or shared between high-band array 3 and high-band array 4.

FIG. 6 shows a signal S1, also labeled as (161), representing the RF signal(s) intended for transmission via high-band antenna array 1, e.g., in the frequency range 1710-2170 MHz. Signal S2, also labeled as (162), represents the RF signal(s) intended for transmission via high-band antenna array 2, e.g., in the frequency range 2500-2690 MHz. The description of how signals, S1 and S2 are processed and details of the high-band arrays are described in connection with the example of FIG. 1. Signals for transmission via high-band antenna array 3 and high-band antenna array 4 are not shown, for clarity. Thus, those skilled in the art will understand that identical (or similar) RF feed arrangements can be used for the transmission of signals via high-band antenna array 3 and high-band antenna array 4.

Similarly, for clarity and ease of understanding, the RF distribution or feed network for the low-band array of antenna elements is not shown. Thus, those skilled in the art will understand that a conventional distribution and phase shifting network may be used to convey low-band signals. Although the example of FIG. 6 is similar to the example of FIG. 3, a notable difference is that the example of FIG. 6 duplicates the two high-band antenna arrays and places these to the other side of the low-band antenna array, thus creating a symmetrical array face topology, with 5× arrays in total.

As per the example of FIG. 3, the choice of antenna element spacing is selected to allow a repeating "unit cell" topology, along the array face. For example, a first "unit cell" (181) includes low-band element $146_1$ and high-band antenna array 1 antenna elements $113_1$ and $113_2$, and high-band antenna array 3 elements $113_{21}$ and $113_{22}$. In one embodiment, the antenna element pitch, $d_{e1}$, also labeled as (191), is 130 mm for the non-shared antenna elements $113_1$-$113_7$ of high-band 1 antenna array (1710-2170 MHz) and is identical (or nearly identical) to the antenna element pitch for the non-shared antenna elements $113_{21}$-$113_{27}$ of high-band antenna array 3. The antenna element pitch $d_{e1}$ is also in a ratio of 1:2 relative to the low-band element pitch, $d_{E1}$=260 mm, also labeled as (193), which applies to low-band antenna elements $146_1$ to $146_3$. Similarly, a second "unit cell" (182) comprises a low-band antenna element, three high-band antenna array 2 antenna elements, and three high-band antenna array 4 elements. For instance, as illustrated, unit cell (182) includes low-band element $146_7$, high-band antenna array 2 antenna elements $113_{14}$, $113_{15}$ and $113_{16}$, and high-band antenna array 4 elements $113_{34}$, $113_{35}$ and $113_{36}$. In one embodiment, the antenna element pitch $d_{e1}$, also labeled as (192) is 100 mm for the non-shared antenna elements $113_{12}$-$113_{19}$ of high-band 2 antenna array (2500-2690 MHz) and is identical (or nearly identical) to the antenna element pitch for the non-shared antenna elements $113_{32}$-$113_{39}$ of high-band antenna array 4, and in a ratio of 1:3 relative to the low-band antenna element pitch, $d_{E2}$=300 mm, also labeled as (194), and applies to low-band antenna elements $146_5$ to $146_8$. The antenna element pitch between low-band antenna elements $146_3$ and $146_4$, and $146_4$ and $146_5$ which are adjacent to the overlapping or shared high-band antenna elements can use an intermediate pitch value (e.g., 280 mm) or a progressive pitch change. As per the example of FIG. 3, the overall low-band array will have an average low-band antenna element pitch of approximately 280 mm, which is about 0.82λ, at the centre frequency of the low-band array (e.g., 790-960 MHz), and represents an excellent value for optimising tilt range, sidelobe levels, and management of inter-element mutual coupling. The "unit cell" approach also allows more flexibility in overall design, especially for different variants of triple array antenna, for example for accommodating different overall length or gain antennas.

The sixth embodiment demonstrates an optimal use of available or constrained antenna aperture or radome space with which to support multiple spectrum bands, with independent beam tilt control per spectrum band. By engineering of the topology, antenna spacing and shared elements the present disclosure provides enhanced design freedoms for maximising antenna performance metrics such as gain, tilt-range, sidelobe level suppression, and minimising cross-band interference, such as PIM.

A seventh embodiment of the present disclosure is illustrated in FIG. 7. FIG. 7 depicts an array topology design (700) having cross-polarized low-band antenna elements ($246_1$-$246_8$), and cross-polarized high-band antenna elements ($213_1$-$213_{36}$). Array topology design (700) is similar to the fourth embodiment with two additional identical (or substantially similar) high-band antenna arrays. In particular, array topology design (700) includes 5× arrays with a central low-band cross-polarised antenna array (244), also labeled as low-band array 1, and comprising cross-polarised low-band antenna elements $246_1$-$246_8$, which support a low-band range of spectrum bands (e.g, 698-894 MHz), plus two high-band cross-polarised antenna arrays (214, 224) designed to support two different yet similar high-band frequency ranges (e.g., high-band 1=split as 1710-1755 MHz/2110-2155 MHz and high-band 2=1850-1990 MHz), which are disposed to one side of the low-band array, plus another two identical (or similar) high-band cross-polarised antenna arrays (264, 274) supporting the same high-band frequency ranges as the first two high-band antenna arrays (e.g., high-band 3=split as 1710-1755 MHz/2110-2155 MHz and high-band 4=1850-1990 MHz), which are disposed on the other side of the low-band array.

High-band antenna array 1 (214) comprises cross-polarised antenna elements $213_1$-$213_{10}$ and high-band antenna array 2 (224) comprises cross-polarised antenna elements $213_7$-$213_{16}$. The antenna elements $213_7$-$213_{10}$ are therefore common, or shared between high-band array 1 and high-band array 2. High-band antenna array 3 (264) comprises cross-polarised antenna elements $213_{21}$-$213_{30}$ and high-band antenna array 4 (274) comprises cross-polarised antenna elements $213_{27}$-$213_{36}$. The antenna elements $213_{27}$-$213_{30}$ are therefore common, or shared between high-band array 3 and high-band array 4.

Signal S1, also labeled as (261), represents the RF signal(s) intended for transmission via high-band antenna array 1, e.g., in the frequency range 1710-1755 MHz/2110-2155 MHz, or more commonly known as the Advanced Wireless Services (AWS) band in the US, Canada, and elsewhere. Signal S2, also labeled as (262), represents the RF signal(s) intended for transmission via high-band antenna array 2, e.g., in the frequency range 1850-1990 MHz, or more commonly known as the Personal Communications Services (PCS) band in the US, Canada, and elsewhere. The description of how signals, S1 and S2 are processed and details of the high-band arrays are described in connection with the example of FIG. 2. Signals for transmission via high-band antenna array 3 and high-band antenna array 4 are not shown, for clarity. Thus, those skilled in the art will understand that identical (or similar) RF feed arrangements can be used for the transmission of signals via high-band antenna array 3 and high-band antenna array 4.

Similarly, for clarity and ease of understanding, the RF distribution or feed network for the low-band array of antenna elements (244) is not shown. Thus, those skilled in the art will understand that a conventional distribution and phase shifting network may be used to convey low-band signals. Although the example of FIG. 7 is similar to the example of FIG. 4, a notable difference is that the example of FIG. 7 duplicates the two high-band antenna arrays and places these to the other side of the low-band array, thus creating a symmetrical array face topology, with 5× arrays in total. As per the example of FIG. 4, the choice of antenna element spacing has been designed to allow a repeating "unit cell" topology, along the array face. Thus, a "unit cell" in the present example may comprise a low-band antenna element, and four high-band antenna elements. For instance exemplary unit cell (281) in FIG. 7 includes low-band element $246_1$ and high-band antenna array 1 antenna elements $213_1$ and $213_2$, and high-band antenna array 3 elements $213_{21}$ and $213_{22}$. In one embodiment, the antenna element pitch, $d_{e1}$, also labeled as (291), is 130 mm, is the same for all the high-band antenna arrays and is approximately in a ratio of 1:2 relative to the low-band element pitch, $d_{E1}$=260 mm, also labeled as (293). Low-band element pitch $d_{E1}$ applies to all low-band elements $246_1$ to $246_8$ and is about $0.7\lambda$, at the centre frequency of the low-band array (e.g., 698-894 MHz), and represents a good value for optimising tilt range, sidelobe levels, and management of inter-element mutual coupling. The "unit cell" approach also allows more flexibility in overall design, especially for different variants of triple array antenna, for example for accommodating different overall length or gain antennas.

The seventh embodiment demonstrates an optimal use of available or constrained antenna aperture or radome space with which to support multiple spectrum bands, with independent beam tilt control per spectrum band. By engineering of the topology, antenna spacing and shared elements the present disclosure provides enhanced design freedoms for maximising antenna performance metrics such as gain, tilt-range, sidelobe level suppression, and minimising crossband interference, such as PIM.

While the foregoing describes various examples in accordance with one or more aspects of the present disclosure, other and further example(s) in accordance with the one or more aspects of the present disclosure may be devised without departing from the scope thereof, which is determined by the claim(s) that follow and equivalents thereof.

What is claimed is:

1. An antenna system, comprising:
at least two linear antenna arrays comprising:
a first linear antenna array comprising a first plurality of antenna elements; and
a second linear antenna array comprising a second plurality of antenna elements, wherein the first linear antenna array is for transmitting and receiving signals in a first spectrum band, and wherein the second linear antenna array is for transmitting and receiving signals in a second spectrum band that is different from the first spectrum band;
wherein the first linear antenna array and second linear antenna array are arranged to form a combined linear array of antenna elements, wherein a length of the combined linear array of antenna elements is greater than a length of the first linear antenna array and a length of the second linear antenna array; and
wherein at least two consecutive antenna elements are common for both the first plurality of antenna elements and the second plurality of antenna elements, wherein the at least two consecutive antenna elements are deployed in a region of overlap between the length of the first linear antenna array and the length of the second linear antenna array, wherein the region of overlap includes the at least two consecutive antenna elements and does not include antenna elements of the first plurality of antenna elements that are exclusive to the first linear antenna array and does not include antenna elements of the second plurality of antenna elements that are exclusive to the second linear antenna array, wherein the at least two consecutive antenna elements operate contiguously across a range of frequencies between and including the first spectrum band and the second spectrum band.

2. The antenna system of claim 1, where an antenna element spacing for the first linear antenna array and the second linear antenna array is a same distance.

3. The antenna system of claim 2, further comprising:
a third linear antenna array comprising a third plurality of antenna elements for operation in a third spectrum band, wherein the third linear antenna array is positioned co-axially to the combined linear array, and where the length of the combined linear array is approximately the same as a length of the third linear antenna array.

4. The antenna system of claim 2, further comprising:
a third linear antenna array comprising a third plurality of antenna elements for operation in a third spectrum band, wherein the third linear antenna array is positioned adjacent to the combined linear array, and wherein the length of the combined linear array is approximately the same as a length of the third linear antenna array.

5. The antenna system of claim 4, further comprising:
a fourth linear antenna array, comprising:
a fourth plurality of antenna elements, wherein the fourth plurality of antenna elements is of a same configuration as the first plurality of antenna elements; and
a fifth linear antenna array, comprising:
a fifth plurality of antenna elements, wherein the fifth plurality of antenna elements is of a same configuration as the second plurality of antenna elements,
wherein the fourth linear antenna array and the fifth linear antenna array are positioned adjacent to the third linear antenna array to form a symmetric array face of five arrays.

6. The antenna system of claim 4, wherein the antenna element spacing for the first linear antenna array and the second linear antenna array is an integer ratio to an antenna element spacing of the third linear antenna array.

7. The antenna system of claim 6, further comprising:
a fourth linear antenna array, comprising:
   a fourth plurality of antenna elements, wherein the fourth plurality of antenna elements is of a same configuration as the first plurality of antenna elements; and
a fifth linear antenna array, comprising:
   a fifth plurality of antenna elements, wherein the fifth plurality of antenna elements is of a same configuration as the second plurality of antenna elements,
wherein the fourth linear antenna array and the fifth linear antenna array are positioned adjacent to the third linear antenna array to form a symmetric array face of five arrays.

8. The antenna system of claim 1, further comprising:
a third linear antenna array comprising a third plurality of antenna elements for operation in a third spectrum band, wherein the third linear antenna array is positioned adjacent to the combined linear array, and where the length of the combined linear array is approximately the same as a length of the third linear antenna array.

9. The antenna system of claim 8, further comprising:
a fourth linear antenna array, comprising:
   a fourth plurality of antenna elements, wherein the fourth plurality of antenna elements is of a same configuration as the first plurality of antenna elements; and
a fifth linear antenna array, comprising:
   a fifth plurality of antenna elements, wherein the fifth plurality of antenna elements is of a same configuration as the second plurality of antenna elements,
wherein the fourth linear antenna array and the fifth linear antenna array are positioned adjacent to the third linear antenna array to form a symmetric array face of five arrays.

10. The antenna system of claim 8, wherein an antenna element spacing of non-shared antenna elements of the first linear antenna array is an integer ratio to an antenna element spacing of adjacent antenna elements of the third linear antenna array, and wherein an antenna element spacing of non-shared antenna elements of the second linear antenna array is a different integer ratio to the antenna element spacing of the adjacent antenna elements of the third linear antenna array.

11. The antenna system of claim 10, further comprising:
a fourth linear antenna array, comprising:
   a fourth plurality of antenna elements, wherein the fourth plurality of antenna elements is of a same configuration as the first plurality of antenna elements; and
a fifth linear antenna array, comprising:
   a fifth plurality of antenna elements, wherein the fifth plurality of antenna elements is of a same configuration as the second plurality of antenna elements,
wherein the fourth linear antenna array and the fifth linear antenna array are positioned adjacent to the third linear antenna array to form a symmetric array face of five arrays.

12. The antenna system of claim 1, further comprising:
a first radio frequency distribution and phase-shifting network to distribute radio frequency power and impart a phase profile across the first linear antenna array, wherein the first linear antenna array is connected to the first radio frequency distribution and phase-shifting network; and
a second radio frequency distribution and phase-shifting network to distribute radio frequency power and impart a phase profile across the second linear antenna array, wherein the second linear antenna array is connected to a second radio frequency distribution and phase-shifting network.

13. The antenna system of claim 12, further comprising:
at least one diplexing filter, wherein the at least two consecutive antenna elements that are included in both the first plurality of antenna elements and the second plurality of antenna elements are connected to the first radio frequency distribution and phase-shifting network and to the second radio frequency distribution and phase-shifting network via the at least one diplexing filter.

14. The antenna system of claim 1, wherein an antenna element spacing between the at least two consecutive antenna elements is an intermediate value between an antenna element spacing of other antenna elements of the first plurality of antenna elements and an antenna element spacing of other antenna elements of the second plurality of antenna elements.

15. A method for communication using an antenna system, the method comprising:
receiving a first input signal for transmission in a first spectrum band;
receiving a second input signal for transmission in a second spectrum band;
transmitting the first input signal from a first linear antenna array of the antenna system in the first spectrum band, the first linear antenna array comprising a first plurality of antenna elements; and
transmitting the second input signal from a second linear antenna array of the antenna system in the second spectrum band, the second linear antenna array comprising a second plurality of antenna elements, wherein the first linear antenna array and second linear antenna array are arranged to form a combined linear array of antenna elements, wherein a length of the combined linear array of antenna elements is greater than a length of the first linear antenna array and a length of the second linear antenna array, wherein at least two consecutive antenna elements are common for both the first plurality of antenna elements and the second plurality of antenna elements, wherein the at least two consecutive antenna elements are deployed in a region of overlap between the length of the first linear antenna array and the length of the second linear antenna array, wherein the region of overlap includes the at least two consecutive antenna elements and does not include antenna elements of the first plurality of antenna elements that are exclusive to the first linear antenna array and does not include antenna elements of the second plurality of antenna elements that are exclusive to the second linear antenna array, wherein the at least two consecutive antenna elements operate contiguously across a range of frequencies between and including the first spectrum band and the second spectrum band.

16. The method of claim 15, further comprising:
receiving a third input signal for transmission in a third spectrum band; and
transmitting the third input signal from a third linear antenna array of the antenna system in the third spectrum band, the third linear antenna array comprising a third plurality of antenna elements.

17. The method of claim 16, wherein the third linear antenna array is positioned adjacent to the combined linear array, and where the length of the combined linear array is approximately the same as a length of the third linear antenna array.

18. The method of claim 16, wherein the third linear antenna array is positioned co-axially to the combined linear array, and where the length of the combined linear array is approximately the same as a length of the third linear antenna array.

19. The method of claim 15, wherein the first input signal is received via a first radio frequency distribution and phase-shifting network that is connected to the first linear antenna array, and wherein the second input signal is received via a second radio frequency distribution and phase-shifting network that is connected to the second linear antenna array.

20. A method for communication using an antenna system, the method comprising:
receiving a first signal in a first spectrum band via a first linear antenna array of the antenna system, the first linear antenna array comprising a first plurality of antenna elements;
receiving a second signal in a second spectrum band via a second linear antenna array of the antenna system, the second linear antenna array comprising a second plurality of antenna elements, wherein the first linear antenna array and second linear antenna array are arranged to form a combined linear array of antenna elements, wherein a length of the combined linear array of antenna elements is greater than a length of the first linear antenna array and a length of the second linear antenna array, wherein at least two consecutive antenna elements are common for both the first plurality of antenna elements and the second plurality of antenna elements, wherein the at least two consecutive antenna elements are deployed in a region of overlap between the length of the first linear antenna array and the length of the second linear antenna array, wherein the region of overlap includes the at least two consecutive antenna elements and does not include antenna elements of the first plurality of antenna elements that are exclusive to the first linear antenna array and does not include antenna elements of the second plurality of antenna elements that are exclusive to the second linear antenna array, wherein the at least two consecutive antenna elements operate contiguously across a range of frequencies between and including the first spectrum band and the second spectrum band;
outputting the first signal via a first radio frequency distribution and phase-shifting network that is connected to the first linear antenna array; and
outputting the second signal via a second radio frequency distribution and phase-shifting network that is connected to the second linear antenna array.

21. The method of claim 20, further comprising:
separating, via at least one diplexing filter, a component signal of the first signal and a component signal of the second signal as received via the at least two consecutive antenna elements that are included in both the first plurality of antenna elements and the second plurality of antenna elements.

* * * * *